United States Patent [19]

Pierce et al.

[11] Patent Number: 5,898,826
[45] Date of Patent: *Apr. 27, 1999

[54] METHOD AND APPARATUS FOR DEADLOCK-FREE ROUTING AROUND AN UNUSABLE ROUTING COMPONENT IN AN N-DIMENSIONAL NETWORK

[75] Inventors: Paul R. Pierce; Linda C. Ernst; David S. Dunning, all of Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/562,200

[22] Filed: Nov. 22, 1995

[51] Int. Cl.$^6$ ........................................ G06F 11/00
[52] U.S. Cl. ........................................ 395/182.02
[58] Field of Search .................... 395/182.02, 200.15, 395/311, 312; 370/400, 406, 351, 352, 353, 354, 355, 356, 237, 238, 217, 218, 225, 389, 401

[56] References Cited

U.S. PATENT DOCUMENTS

| | | | |
|---|---|---|---|
| 4,814,980 | 3/1989 | Peterson et al. | 364/200 |
| 5,008,882 | 4/1991 | Peterson et al. | 370/94.3 |
| 5,072,379 | 12/1991 | Eberhardt | 364/402 |
| 5,105,424 | 4/1992 | Flaig et al. | 370/94.1 |
| 5,138,615 | 8/1992 | Lamport et al. | 370/94.3 |
| 5,151,900 | 9/1992 | Snyder et al. | 370/94.3 |
| 5,170,393 | 12/1992 | Peterson et al. | 370/94.1 |
| 5,218,676 | 6/1993 | Ben-Ayed et al. | 395/200 |
| 5,517,656 | 5/1996 | Shi | 395/800 |
| 5,533,198 | 7/1996 | Thorson | 395/200.15 |
| 5,583,990 | 12/1996 | Birrittella et al. | 395/200.01 |

OTHER PUBLICATIONS

M. Sultan Alam, et al., "Routing in Modular Fault Tolerant Multiprocessor Systems", 22nd Annual Intl. Symp. on Fault–tolerant Computing, pp. 185–193, 1992.

R.V. Bopanna, et al., "New Wormhole Routing Algorithms for Multicomputers", International Parallel Processing Symposium, pp. 419–423, 1993.

S. Borkar, et al., "iWarp: An Integrated Solution To High–speed Parallel Computing", Supercomputing '88, pp. 330–339, 1988.

J. Bruck, et al., "Efficient Fault–Tolerant Mesh and Hypercube Architectures", International Symposium on Fault–tolerant Computing, pp. 162–169, 1992.

S. Chalsani, et al., "Fault–tolerant Routing in MIN–based Supercomputers", Supercomputing, pp. 244–253, 1990.

M.S. Chen, et al., "Depth–first Search Approach For Fault–tolerant Routing In Hypercube Multicomputers", IEEE Trans. on Parallel and Distributed Systems, pp. 152–159, Apr. 1990.

A. A. Chien, et al., "Planar–adaptive Routing: Low–cost Adaptive Networks For Multiprocessors", Proc. 19th Annual International Symposium on Computer Architecture, pp. 268–277, 1992.

L. Ciminiera, et al. "A Connecting Network With Fault Tolerance Capabilities", IEEE Transactions on Computers, pp. 578–580, Jun. 1986.

(List continued on next page.)

Primary Examiner—Robert W. Beausoliel, Jr.
Assistant Examiner—Stephen C. Elmore
Attorney, Agent, or Firm—Blakely, Sokoloff, Taylor & Zafman LLP

[57] ABSTRACT

A method and apparatus for deadlock-free routing around an unusable routing component in a network reroutes paths between source and destination nodes by initially identifying an unusable routing component. A shadow direction within the network is then determined, the shadow direction being from the unusable routing component to an edge of the network. The paths between nodes are then rerouted so that the paths bypass the unusable routing component and limit the use of any routing components in the network between the unusable routing component and the edge in the shadow direction.

32 Claims, 10 Drawing Sheets

OTHER PUBLICATIONS

W. Dally, et al., "Adaptive Routing using Virtual Channels", Laboratory for Computer Science Massachusetts Institute of Technology, pp. 1–24, Jul. 1990.

W. Dally, et al., "Deadlock–free Adaptive Routing In Multicomputer Networks Using Virtual Channels", IEEE Trans. on Parallel and Distributed Computing, pp. 466–475, Apr. 1993.

W. Dally, et al., "Deadlock–Free Message Routing In Multiprocessor Interconnection Networks", IEEE Transactions on Computers, pp. 547–553, May 1987.

W. Dally, "Performance Analysis of k–ary n–cube Interconnection Networks", IEEE Transactions on Computers, pp. 775–785, Jun. 1990.

W. Dally, et al., "The torus routing chip", Distributed Computing, pp. 187–196, 1986.

W. Dally, "Virtual Channel Flow Control", IEEE Trans. on Parallel and Distributed Systems, pp. 194–205, 1990.

Abdel Aziz Farrag, "Tolerating A Faulty Edge In A Multi–Dimensional Mesh", International Phoenix Conference on Computers and Communications, pp. 9–15, 1993.

S.A. Felperin, et al., "Routing Techniques For Massively Parallel Communications", proceedings of the IEEE, pp. 488–503, 1991.

Tse–yun Feng, "A Survey of Interconnection Networks", Computer, pp. 5–20, 1981.

P.T. Gaughan, et al., "Pipelined Circuit–switching: A Fault–tolerant Variant of Wormhole Routing", Proc Fourth IEEE Symposium on Parallel and Distributed Processing, pp. 148–155/92.

C.J. Glass, et al., "Fault–tolerant Wormhole Routing In Meshes", 23rd Annual International Symposium on Fault–Tolerant Computing, pp. 240–249, 1993.

C.J. Glass, et al., "The Turn Model For Adaptive Routing", Proc 19th Annual Int. Symposium on Computer Architecture, pp. 278–287, 1992.

J. Gordon, et al., "Hypercube Message Routing In The Presence of Faults", 3rd Hypercube Computers Conference, pp. 318–327, 1988.

R. E. Johnson, et al, "Interconnect Topologies with Point–to–Point Rings", Computer Science Department University of Wisconsin–Madison, pp. 1–30 and A1–A6, Dec. 1991.

J. Kim, et al., "Deadlock–free Fault–tolerant Routing In Injured Hypercubes", IEEE Trans. on Computers, pp. 1078–1088, Sep. 1993.

S., Latifi, et al, "Optimal Ring Embedding In Hypercubes With Faulty Links", 22nd Annual Intl. Symp. on Fault–tolerant Computing, pp. 178–184, 1992.

T. Lee, et al., "A Fault–tolerant Communication Scheme for Hypercube Computers", IEEE Trans. on Computers, pp. 1242–1256, Oct. 1992.

X. Lin, et al., "Deadlock–Free Multicast Wormhole Routing in Multicomputer Networks", Department of Computer Science Michigan State University, pp. 1–24, Oct. 1990.

X. Lin, et al., "Performance Evaluation of Multicast Wormhole Routing in 2D–Mesh Multicomputers", 1991 International Conference on Parallel Processing, pp. I–435—1–442, 1991.

D.H. Linder, et al., "An Adaptive and Fault Tolerant Wormhole Routing Strategy For k–ary n–cubes", IEEE Trans on Computers, pp. 2–12, 1991.

K. Padmanabhan, et al., "A Class of Redundant Path Multistage Interconnection Networks", IEEE Trans. on Computers, pp. 1099–1108, Dec. 1983.

M. Peercy, et al., "Distributed Algorithms for Shortest–Path, Deadlock–free Routing and Broadcasting In Arbitrarily Faulty Hypercubes", 20th Ann. Intl. Symp. on Fault–tolerant computing, pp. 218–225, 1990.

C.S. Raghavendra, et al., "Free Dimensions—An Effective Approach To Achieving Fault Tolerance In Hypercubes", 22nd Annual Intl. Symp. on Fault–tolerant Computing, pp. 170–117/92.

D. A. Reed, et al., "Interconnection Networks", IEEE Computer, pp. 63–73, Jun. 1987.

A. Varma, et al., "Fault–tolerant routing in Multistate Interconnection Networks", IEEE Transactions on Computers, pp. 385–393, Mar. 1989.

C.S., Yang, et al., "A Reconfigurable Modular Fault–tolerant Binary Tree Architecture", International Phoenix Conference on Computers and Communications, pp. 37–41, 1993.

J.T. Yantchev, et al., "Adaptive, Low–latency Deadlock–free Packet Routing For Networks of Processors", IEEE proceedings, pp. 178–186, May 1989.

Yener et al., "Fault Tolerant Convergence Routing", Proceedings of ICNP, IEEE, pp. 229–238, Oct. 1994.

METHOD AND APPARATUS FOR DEADLOCK-FREE ROUTING AROUND AN UNUSABLE ROUTING COMPONENT IN AN N-DIMENSIONAL NETWORK

BACKGROUND OF THE INVENTION

1. Field of the Invention

The present invention pertains to computer networks and particularly to a method and apparatus for deadlock free routing around a failed routing component.

2. Background

Throughout the evolution of computer technology the focus has been on increasing the power and speed of single autonomous processors. This has led to today's stand-alone processors which have respectable computational and data processing power. However, in recent years, parallel processing computer architectures have demonstrated substantial performance advantages over more traditional sequential computer architectures. In particular, as computational needs have grown and the performance advantages offered by parallel processing have come to be recognized, multiple processing units have been coupled together to form computer system networks. For example, multiple processing units may be networked together as a local area network (LAN) that allows individuals with personal computer systems to communicate with one another. Alternatively, a "supercomputer" may be formed by coupling a number of processing units together via a high performance network which enables the processing units to operate together to perform various tasks. These supercomputers are beneficial to users because they provide an extremely fast, powerful, and cost-effective system to carry out users' requests.

Unfortunately, as the number of components in the computer system network increases, the probability that a component will become faulty during system operation also increases. A network with thousands of components has a relatively low mean time between failure for the system components. That is, there is a relatively high probability that one component within the network will fail within a given period of time (for example, one failure per week). In order to be useful to the user(s), the network should be able to resolve these component failures. A system that shuts itself down upon detecting a faulty component and cannot re-start until the component is repaired or replaced reduces the availability of the system and increases the inconvenience to the users. Thus, it would be beneficial to provide a system which is able to automatically bypass faulty network components.

Furthermore, many users have neither the technical expertise nor the desire to resolve a component failure in the network by indicating to the network how to route around the faulty component. In addition, performing such a correction could be very time-consuming, and distracts the user from his or her other responsibilities. Thus, it would be beneficial to provide a system which resolves the failure of a component in a manner which is transparent to the system user(s).

In addition, depending on the layout of a network, a faulty component could cut off multiple good components from the remainder of the network. Depending on the type of network, this could mean that some computers could not communicate with others, or that certain processing units would not be available to the system user, even though they are in good working condition. Thus, it would be beneficial to provide a system which reduces the number of good components which are disconnected from the remainder of the system by a faulty component.

Additionally, network systems typically have a significant number of processing and routing components, and corresponding hardware complexity. Such additional numbers and complexity further increases the relative mean time between failure of the system. Thus, it would be beneficial to provide a system which effectively routes around faulty components while at the same time provides little increase in hardware complexity as well as little decrease in system performance.

Furthermore, network systems should effectively resolve "deadlock" situations. A deadlock situation occurs when one or more components within the network cannot advance in their operation due to resources within the system which the component(s) requires being unavailable. One possible occurrence of a deadlock situation is dependent on the routing technique utilized in the system. In one routing technique, referred to as "circuit switching," a source node sends control information for a packet through its intended path to a destination node in the network to reserve each link in the path. Once the entire path is reserved, the source node transfers the data along the reserved path to the destination node.

In another routing technique, referred to as "wormhole routing," the source node sends the necessary control information through its intended path to the destination node, followed immediately by the data. That is, the source node does not wait for the entire path to be reserved prior to beginning transfer of the data. In both of these routing techniques, the data packet maintains reservation of portions of the path already reserved while waiting for subsequent portions to be reserved. Thus, a deadlock situation may arise when, for example, two or more source nodes are attempting to transfer data to one or more destination nodes and none can advance because another is blocking a portion of the data path required by the other. Thus, in order to provide continued performance of a network system, such deadlock issues need to be resolved.

As will be described in more detail below, the present invention provides for a method and apparatus that achieves these and other desired results which will be apparent to those skilled in the art from the description to follow.

SUMMARY OF THE INVENTION

A method and apparatus for deadlock-free routing around an unusable routing component in an n-dimensional network is described herein. The method reroutes paths between source and destination nodes by initially identifying an unusable routing component. A shadow direction within the network is then determined, the shadow direction being from the unusable routing component to an edge of the network. The paths between nodes are then rerouted so that the paths bypass the unusable routing component and the use of any routing components in the network between the unusable routing component and the edge in the shadow direction is limited.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

The present invention provides a method and apparatus for deadlock-free routing around an unusable routing component in a network. When a routing component within the network becomes unusable, the present invention selects a shadow direction from the unusable component to one of the edges of the network. All routing components between the unusable routing component and this edge are referred to as shadow routing components. Paths within the network are then rerouted to bypass the unusable component and possibly the shadow components (depending on the particular path).

Figure 1:
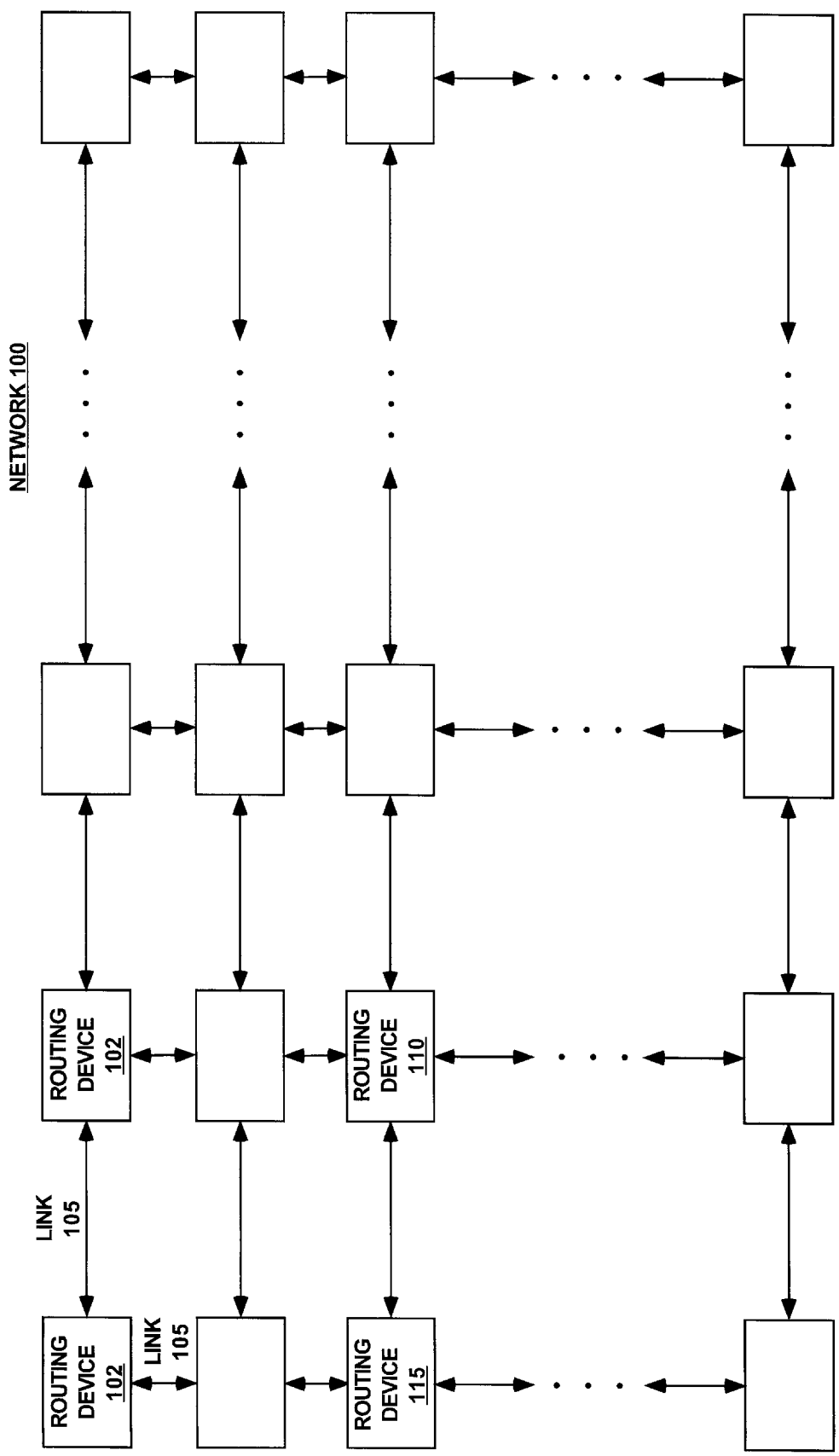
FIG. 1 is a network system which can be used according to one embodiment of the present invention.

FIG. 1 shows a network system which can be used by one embodiment of the present invention. A two-dimensional mesh network 100 is shown including multiple routing devices 102, also referred to as routers. Each router 102 is coupled to the two, three, or four routers adjacent to the router in the matrix, depending on its location in the matrix as shown. A network 100 may have any number of routing devices.

Each router 102 is coupled to its adjacent routers 102 via a bi-directional, full-duplex communication link 105. Communication link 105 can be any of a wide variety of conventional communication devices. In one embodiment, communication link 105 is a set of wires or other signal transmission medium via which signals issued by a source router propagate to a destination router.

Figure 2:
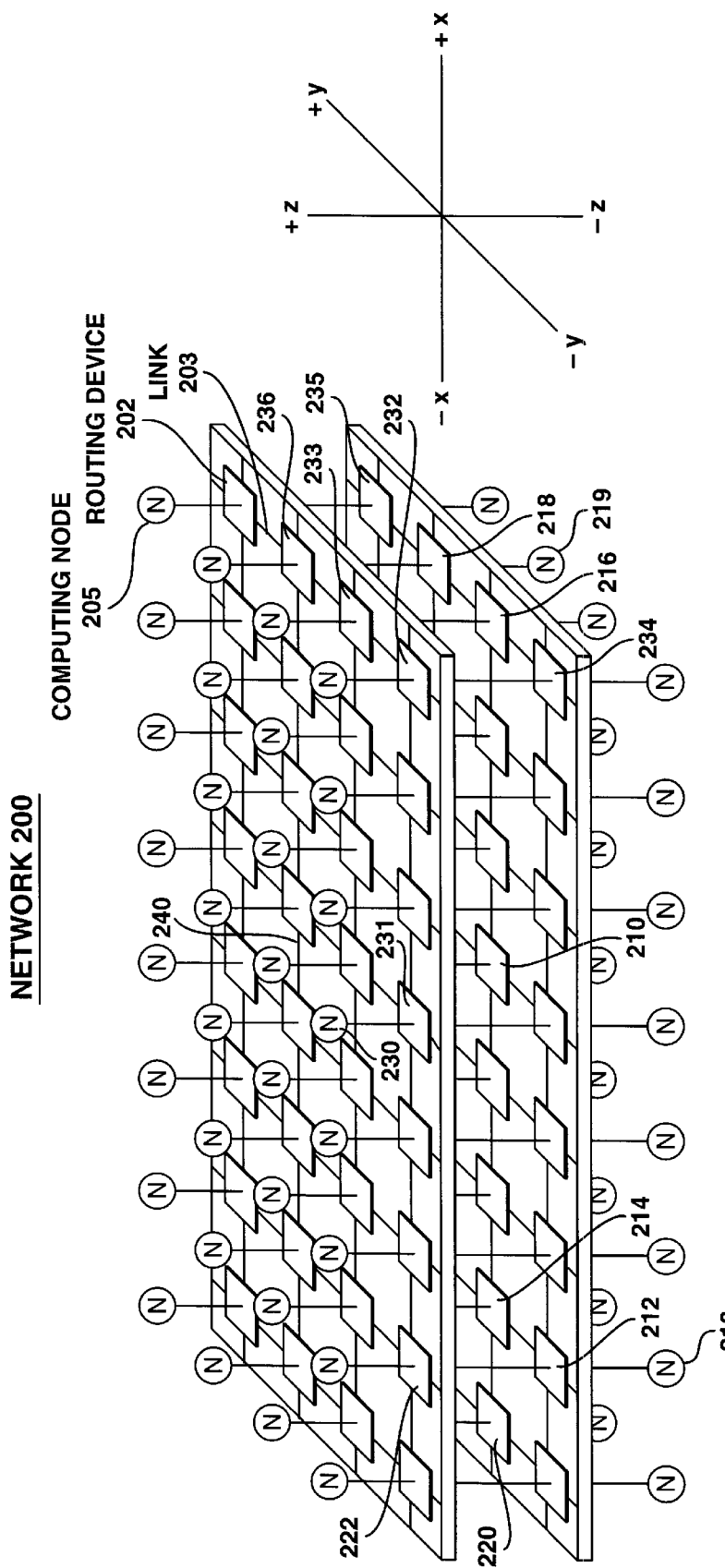
FIG. 2 is an alternate network system such as can be used by one embodiment of the present invention.

FIG. 2 shows an alternate network system such as can be used by one embodiment of the present invention. A three-dimensional mesh network 200 is shown including multiple routing devices 202, also referred to as routers. Each router 202 is coupled to the three, four, or five routers adjacent to the router in the network, depending on its location in the network as shown. The routers are coupled together via a communication link 203, analogous to link 105 of FIG. 1. It is to be appreciated that in a three-dimensional mesh network, some routers may also be coupled to six adjacent routers.

A network 200 may have any number of routing devices 202. In one embodiment, network 200 includes 64 such routing devices organized in a 4-by-8-by-2 grid. In one embodiment of the present invention, each router 202 is coupled to a computing node 205, as discussed in more detail below. In alternative embodiments, only some of the routers 202 are coupled to computing nodes 205.

The devices which provide for the routing of data within the network system are collectively referred to as "routing components". These routing components include, for example, the routers 102 and communication links 105 of FIG. 1, and the routers 202 and communication links 203 of FIG. 2.

It is to be appreciated that the network systems shown in FIGS. 1 and 2 represent a wide variety of computer networks. For example, the network could be a mesh-based interprocessor communication network used to couple computing nodes together in a supercomputer. Alternatively, the network could be a LAN which couples multiple personal computers together, such as multiple file or video servers.

It is also to be appreciated that the present invention is not limited to two-dimensional and three-dimensional networks as shown in FIGS. 1 and 2. Routers may be coupled together in an n-dimensional network having any of a wide variety of topologies, where n can be any number greater than or equal to two, and each dimension within the network can have any number of routers greater than or equal to one.

In the descriptions which follow, reference is made to the "edge" of a network. An edge of a network exists at routers which are not connected in at least one direction of at least one dimension to another router. For example, router 115 of FIG. 1 is at an edge, whereas router 110 is not at an edge. By way of another example, each router in FIG. 2 is at an edge because each router is not coupled to another router in at least one direction in the z dimension.

One additional network topology which can also be used with the present invention is the torus topology. In a two-dimensional torus network, for example, the routers which would be at the edges of the network of FIG. 1 are directly coupled to the routers on the opposing edges of the network; thus, each router is directly coupled to four other routers. It is known in the art that one problem with torus networks is that cyclical dependencies can result. A cyclical dependency exists when a path is able to circle around within the network. It is known in the art that if such circling is allowed, deadlocks can exist. A wide variety of conventional mechanisms can be used, such as restricted use of virtual channels, to resolve the deadlock situation in torus networks. Moreover, each of these techniques generates an edge or other identifiable boundary which can be used by the present invention as an edge. Thus, the present invention can be used in any of a wide variety of network topologies, including those which do not appear to have a physical edge.

Figure 3:
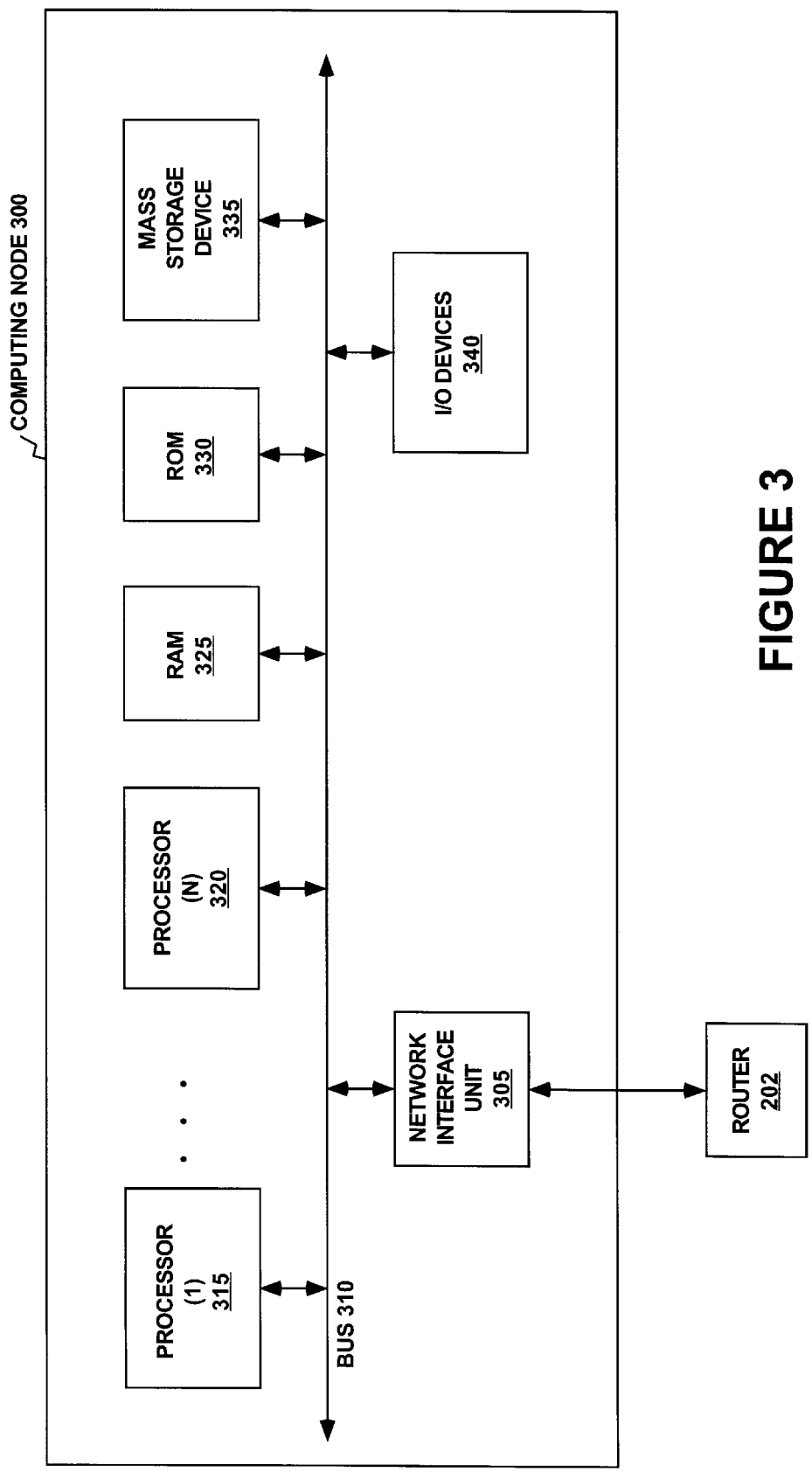
FIG. 3 shows a block diagram of a computing node such as may be used by one embodiment of the present invention.

FIG. 3 shows a block diagram of a computing node such as may be used by one embodiment of the present invention. Computing node 300 is an example of a computing node 205 of FIG. 2. A computing node 300 is shown comprising a bus or other communication device 310 for communicating information between one or more processors 315 and 320 for processing information and instructions. In one implementation, the present invention includes Intel® Architecture microprocessors as processors 315 and 320;

however, the present invention may utilize any type of microprocessor architecture. It is to be appreciated that the particular microprocessor architecture used is not especially germane to the present invention.

In one embodiment, bus 310 includes arbitration, address, data and control buses (not shown). The system also includes random access memory (RAM) 325 coupled with bus 310 for storing information and instructions for the processors 315 and 320, a read only memory (ROM) 330 coupled with the bus 310 for storing static information and instructions for the processors 315 and 320, mass storage device 335 such as a magnetic or optical disk and disk drive coupled with the bus 310 for storing information and instructions, and input/output (I/O) devices 340 coupled with the bus 310 which input and output data and control information to and from the processors 315 and 320. I/O devices 340 include, for example, a display device, an alphanumeric input device including alphanumeric and function keys, and a cursor control device. A hard copy device such as a plotter or printer may also be included in I/O devices 340 for providing a visual representation of computer images. Additionally, a network connector may also be included in I/O devices 340 for coupling the node to a conventional network, such as an Ethernet LAN.

A network interface unit 305 is also coupled with the bus 310 for allowing the node 300 to communicate with the router 202. In an alternate embodiment, network interface unit 305 is coupled to a separate I/O bus, such as a Peripheral Component Interconnect (PCI) bus, which is coupled to bus 310 via a bus bridge. In another alternate embodiment, network interface unit 305 is included as part of I/O devices 340. The network interface unit 305 operates in a conventional manner to transfer information to and from a router 202.

It is to be appreciated that certain implementations of the present invention may include additional processors or other components. Furthermore, certain implementations of the present invention may not require nor include all of the above components. For example, processor 320 or a display device may not be coupled to bus 310.

Returning to FIG. 2, the present invention routes packets of data from source nodes to destination nodes in the network 200 using "source routing". A packet of data, as referred to herein, is the data which is being transferred from the source node to the destination node. Each packet may be of any size, typically ranging from a few bytes to several megabytes. In source routing, the source node determines which path through the network 200 to utilize for transferring packets of data to a particular destination node. The path of a packet of data refers to the routers and links the packet travels through between the source and destination nodes. The path of the packet consists of one or more pathway segments. For example, a path in the network of FIG. 2 exists from node 213 to transfer packets to node 219. The path that node 213 selects could include, for example, pathway segments between router 212 and router 214, router 214 and router 216, and router 216 and router 218.

In one embodiment of the present invention, separate routers are not necessary. In this embodiment, a component of each computing node, such as the network interface unit 305 of FIG. 3, is responsible for transferring information between the node 300 and other nodes within the network 200. Thus, packets are routed through the network interface unit 305 of the computing nodes 205 of FIG. 2, rather than through the routers 202.

Figure 4:
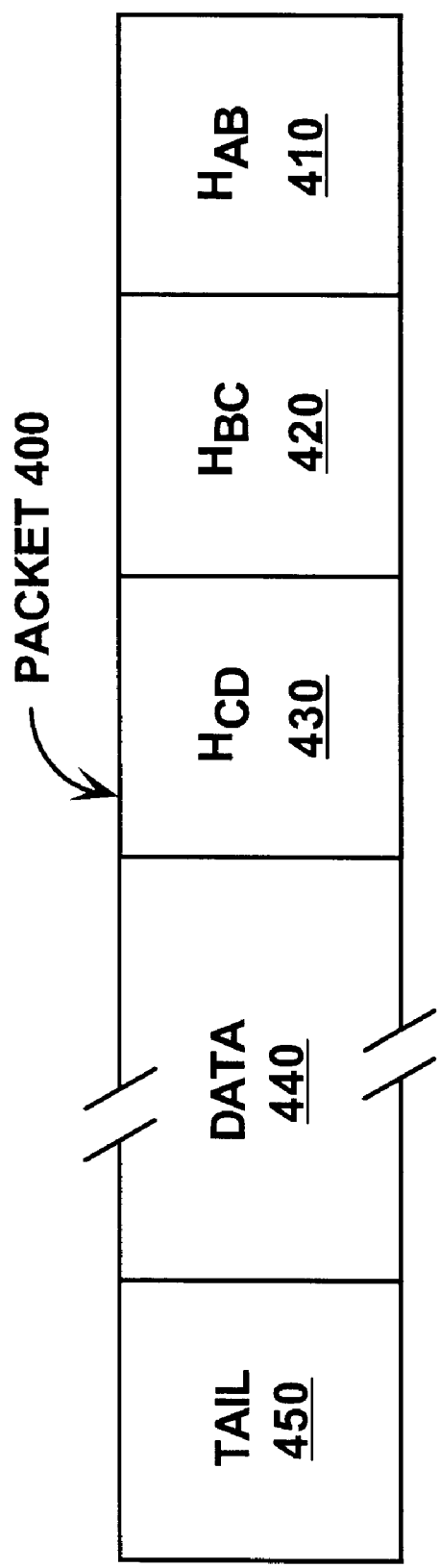
FIG. 4 shows a packet of data according to one embodiment of the present invention.

In one embodiment of the present invention, source routing is implemented utilizing multiple header blocks for a packet of data as shown in FIG. 4. This use of multiple header blocks is referred to as "chained headers" because multiple headers can be chained together to identify the proper route. In source routing, each router in the network is assigned an identifier, such as a unique identification number. The packet 400 is generated by the source node and includes multiple header blocks which contain the necessary control information to indicate to the routers the path of the packet through the network 200. The packet 400 shown includes three header blocks 410, 420 and 430. Header block 410 is the first header block and indicates that the source node is the computing node coupled to router A (e.g., router 212) and the first pathway segment is from router A to router B (e.g., router 212 to router 214). The subsequent header blocks 420 and 430 indicate pathway segments from router B to router C (e.g., router 214 to router 216), and router C to router D (e.g., router 216 to router 218), respectively. It should be noted that the header blocks in packet 400 indicate where the path through network 200 should begin, end, and the destination routers for pathway segments. For example, in FIG. 2 additional routers may exist between routers 212, 214, 216 and 218. However, since those additional routers are not indicated as destination routers, the path of the packet continues in the same direction at these additional routers.

The header blocks 410–430 contain control information which indicate the proper path through the network 200. Following the header blocks 410–430, the packet 400 includes the data 440 and the tail 450. The data, as discussed above, can be bytes or megabytes. The tail 450 indicates the end of packet 400. Packets of data are transferred through the network 200 in units referred to as "flow control units" (flits). In one embodiment, each one of the header blocks 410–430, the tail 450 and each of the data blocks 440 is a single flit. In one implementation of the present invention, each flit is 64 bits; however, a flit could contain any number of bits.

In one embodiment of the present invention, each one of the links 105 shown in FIG. 1 is a 16-bit data bus or other communication means. Therefore, in this embodiment, four separate transfers over the 16-bit bus are used to transfer a single flit. In an alternate embodiment, each one of the links 105 is capable of transferring an entire flit between two routers concurrently. For example, if a flit is 64 bits then each one of the links is a 64-bit bus or other communication means. In one embodiment of the present invention, each one of the header blocks 410–430 and the tail 450 is a single flit. The data portion 440 typically comprises multiple flits and may comprise any number of flits. In one implementation, data portion 440 typically comprises 4 k bytes, or 512 64-bit flits.

In one embodiment of the present invention, routing packets through the network is done using conventional dimension-order routing. In dimension-order routing, packets are routed in one or more of the network dimensions and once routing is begun in a second dimension, then routing in the previous dimension(s) is not resumed.

In one embodiment of the present invention, a single header block is used to identify multiple dimensions for a packet through the network. This single header block indicates a direction of the path and a number of routers to pass through (referred to as "hops" or "jumps") in that direction. In one implementation, the header indicates directions in a z/x/y/z format, which is a variation of dimension-order routing. That is, the header indicates a number of hops to take in the z direction, followed by the number of hops to take in the x direction, followed by the number of hops to take in the y direction, followed by the number of hops to take in the z direction. It is to be appreciated that routing a second time in the z direction as done in this implementation is redundant and not necessary.

In one embodiment of the present invention a header flit includes four path identification fields (one x, one y, and two z) and corresponding direction and count fields. The fields for a header flit according to one embodiment of the present invention are shown in Table I.

TABLE I

| Field | Size | Description |
| --- | --- | --- |
| Z(1) hop count | 3 bits | The number of hops the path first takes in the z dimension. |
| X hop count | 8 bits | The number of hops the path takes in the x dimension. |
| Y hop count | 6 bits | The number of hops the path takes in the y dimension. |
| Z(2) hop count | 3 bits | The number of hops the path takes the second time in the z dimension. |
| Z(1) direction | 1 bit | The direction (positive or negative) for the path the first time in the z dimension. |
| X direction | 1 bit | The direction (positive or negative) for the path in the x direction. |
| Y direction | 1 bit | The direction (positive or negative) for the path in the y direction. |
| Z(2) direction | 1 bit | The direction (positive or negative) for the path the second time in the z dimension. |

Routing is done within the network according to this z/x/y/z format. Thus, the first dimension of movement is in the z dimension. The direction and length of this movement is indicated by the corresponding direction and count fields for the first z-dimension field. Once the count corresponding to the first z dimension reaches zero, the packet "turns" in the network and begins moving the indicated direction for the x dimension. The second, third and fourth dimensions movement are in the x, y and z dimensions, respectively. It is to be appreciated that although up to four dimensions can be used for the path, all four are not required. For example, a particular path may include movement in only the x and y dimensions, or only in the z dimension.

In one embodiment of the present invention, source routing is implemented using a "wormhole routing" technique. In wormhole routing, when a packet of data begins transfer along a path, each portion of the path it begins on is reserved for that packet until the packet tail 450 is received. For example, when router 212 begins the transfer to router 214, router 212 determines whether the link between router 212 and the next router is available. If the link is not available, then the router 212 waits to begin transmission of the packet until the link is available. Once the link is available, router 212 transfers the first flit, header block 410, from router 212 to the next router. Note that this next router may be router 214, or may be an additional router between router 212 and router 214 (not shown). Router 212 then holds that portion of the path to the next router for this packet of data and continues to transfer subsequent flits in the packet to the next router until the tail 450 is transferred. It should be noted, however, that other packets may also be transferred over this same physical link utilizing "virtual channels," as discussed in more detail below, or in the opposite direction, as discussed above.

Each time a router receives data for a new packet, the router checks whether the next link in the path is available, and begins transfer along that link once it is available. The proper link to transfer the data to is indicated in the header block(s). In one implementation, when a router receives a new header block it checks whether it is the destination router for that block. If it is not the destination router, then the router transfers the header block and all subsequent flits in the direction indicated by the header block. However, if the router is the destination router indicated by the first header block, it discards the first header block and checks the subsequent flit (that is, the second header block) to determine the next pathway segment. Once it determines the next pathway segment, the router transfers the second header block and all subsequent flits to the next router in the path.

Once the destination node is reached, the first flit received by the destination router is the last header block. The second flit received by the destination router is the first flit of data 440. In one implementation, this first flit of data 440 is a flit of control information indicating it is the first flit of data. Alternatively, the destination router could know the flit is data and not a header block because a header bit is set in the header blocks 410–430, but is not set in the data blocks 440. Thus, the destination router knows that the computing node coupled to the router is the proper destination for the subsequent flits, and transfers the subsequent flits in the packet to the computing node rather than to another router.

In one embodiment of the present invention, the routers have communication links to the computing nodes to which they are directly coupled. Thus, a router does not need to check whether the computing node it is directly coupled to is the destination node. The path provided by the source node can simply indicate the appropriate communication link to the computing node as the last pathway segment for the packet. Thus, the header block is delivered to the computing node, which can ignore the header block and know that the next flit is data. For example, router 202 of FIG. 2 is coupled to computing node 205 in the positive z direction. Thus, if the last pathway segment indicated for the path is a hop of one in the positive z direction, router 202 provides the packet to computing node 205.

Figure 5:
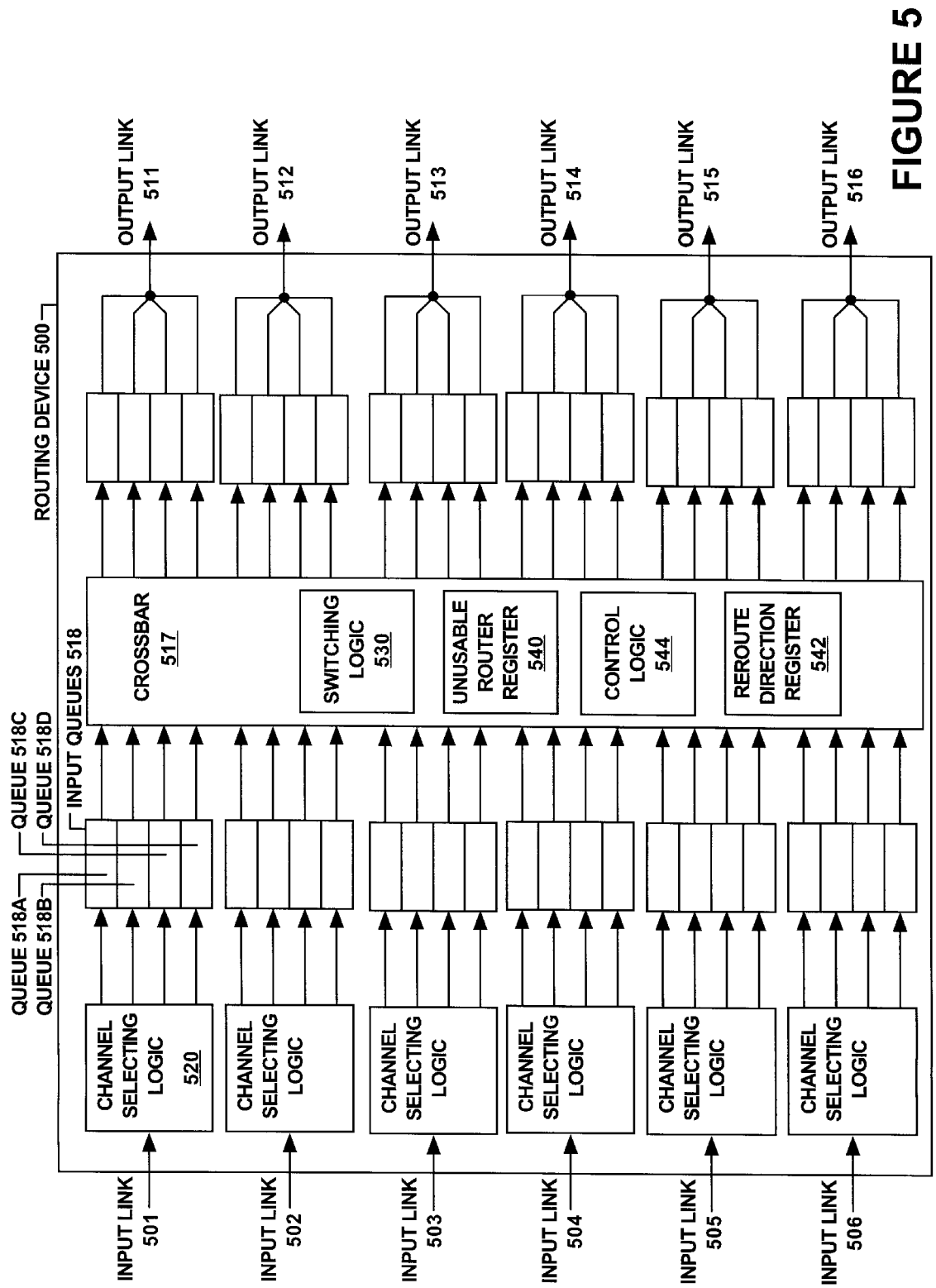
FIG. 5 shows a routing device in more detail according to one embodiment of the present invention.

FIG. 5 shows a routing device according to one embodiment of the present invention in more detail. The router 500 has six input links 501, 502, 503 504, 505 and 506, and six output links 511, 512, 513, 514, 515 and 516. Each of the six input links and the six output links represent one of the links 203 coupled to a router 202 shown in FIG. 2. Therefore, each of the six input and six output links represents one direction in one of the three dimensions (that is, the x, y and z dimensions). The router 500 also includes a crossbar 517 which transfers data received on an input link 501–506 to the appropriate output link 511–516. It will be appreciated that the number of input links and output links which are directly coupled to a router is dependent on the topology of the network and that router's location in the network, as shown in FIGS. 1 and 2.

Each of the six input links 501–506 is coupled to four different inbound queues 518a, 518b, 518c and 518d. The inbound queues 518a–518d are temporary storage facilities in router 500 for incoming data. In one embodiment of the present invention, each one of the inbound queues 518a–518d is a 16-flit first in-first out (FIFO) buffer. Therefore, each of the inbound queues 518a–518d can be smaller than the size of a packet being routed through the network.

Each one of the queues 518a–518d represents a different "virtual channel" or "lane" of the router. That is, even though the router 500 is coupled to only the single input link 501, router 500 can temporarily store data before passing it on to the next router via one of the output links 511–516. Thus, even though a single physical network exists, the router 500 is able to temporarily store data from four separate packets. Thus, router 500 supports four "virtual channels," because the router is able to support four separate data paths using its temporary storage capabilities. Each one of these four virtual channels corresponds to one of the inbound queues 518a–518d.

In one embodiment of the present invention, these virtual channels are configured as static virtual networks. A static virtual network is a network in which paths between source and destination nodes use the same numbered virtual channels. For example, if two virtual networks are supported by the system, then a path between source and destination nodes is entirely in the first network or entirely in the second network (however, note that two separate paths, one in each virtual network, could exist). Thus, packets which router 500 receives on a particular virtual network and transfers to input queue 518a (for example, virtual channel A) will be transferred to virtual channel A in each of the other routers in the system which receive the packet.

In an alternate embodiment of the present invention, static virtual networks are not required. For example, a particular source node may indicate that the path to a destination node should utilize a first virtual channel for the first pathway segment and a second virtual channel for the second pathway segment. In this embodiment, the crossbar 517 checks the control information in the header block(s) received and transfers the subsequent flits of the packet to the channel indicated by the header block. Note that in this embodiment the router 500 also checks whether the second virtual channel of the next link is available (for example, another packet may currently be utilizing the second network).

Each node within the network is able to use any one of the virtual networks. Which virtual network a source node uses to transfer data to a destination node is dependent on several factors, including the existence of a deadlock-free path within the virtual network. In the example shown, four virtual networks are supported. It is to be appreciated however, that any number of virtual networks can be supported by router 500 by using the proper number of input queues 518.

Data is received by router 500 in flits, as discussed above. Upon receipt of a flit of a new packet via input link 501, a channel selecting logic 520 coupled to input link 501 checks the control information in the flit. The channel selecting logic 520 identifies the proper virtual channel for the flit from the control information, and transfers the flit into the queue 518a–518d corresponding to the identified virtual channel.

In one embodiment of the present invention, the first flit of a new packet is a header block. If the header block indicates that the current router is not the destination router for the pathway segment, then the crossbar 517 transfers the first flit and all subsequent flits in the packet to the appropriate output channel of the appropriate output link 511–516. In one embodiment, the appropriate output link is identified by the lane information stored within the header packet, and the appropriate output channel is identified by a direction and a number of hops remaining in the control information of the header packet.

However, if the header block indicates that the current router is the destination router for this pathway segment, then crossbar 517 discards the first header block and checks the second flit. If the second flit is a header block, then crossbar 517 checks the control information in the header block to determine which of the virtual networks the packet is using. The crossbar 517 then transfers the second and all subsequent flits in the packet to the channel of input link 501. The crossbar 517 continues to transfer all subsequent flits to this channel until the tail of the packet is received. If, however, the second flit is not a header block, then the packet is transferred to the computing node connected to the router 500.

In one embodiment of the present invention, each router coupled to a computing node is coupled to that computing node using one of the input links 501–506 and one of the output links 511–516. In this embodiment, the inbound queues 518a–518d and the channel selecting logic 520 operate as discussed above, except that the source of the packets transferred to the channel selecting logic 520 is the computing node rather than another routing device. Additionally, the last jump indicated in a path is a jump in the appropriate direction for input to the destination computing node. For example, in the network of FIG. 2, router 202 is coupled to computing node 205. This connection is in the positive z direction. Therefore, any packets which target computing node 205 should have a path with the last jump being a jump in the positive z direction.

Data received by router 500 via input links 502–506 is handled analogously to the discussion above regarding input link 501.

Crossbar 517 transfers flits from the six input links 501–506 to the six output links 511–516. The channels of each of the six input links 501–506 are multiplexed onto the output links 511–516 by crossbar 517. In one embodiment of the present invention, router 500 operates according to an arbitration policy which ensures that the data being received on each input link 501–506 is treated fairly. In one implementation, this arbitration policy is the well-known round-robin scheme. By ensuring that each input link is treated fairly, packets being transferred on multiple virtual networks progress through the network independent of the progress of packets on any other virtual network. Alternatively, other arbitration policies may be employed which are less fair, such as giving one or more channels priority over the remaining channels. However, these other arbitration policies should be such that the progress of packets on one virtual network does not prevent the progress of packets on another virtual network indefinitely.

In one embodiment of the present invention, crossbar 517 maintains the current state for each of the four channels of the six input links. That is, crossbar 517 keeps track of whether a packet is currently being transferred via a particular channel and the correct outbound link for a packet if a packet is being transferred. In this embodiment, crossbar 517 is a coupling device which connects each input queue of each input link to each outbound channel of each output link. When a new packet is received by channel selecting logic 520, it asserts an access request signal to an arbitration unit for access to the appropriate output channel. If another input link is currently using the requested output channel then the request is denied. Once the output channel is available, the arbitration unit asserts an access granted signal to channel selecting logic 520. Crossbar 517 does not begin transfer of the data to the output link until this access granted signal is received. Thus, conflicts between multiple input links for the same output channel are resolved by the arbitration unit granting access to the output channel to only one input link at a time. Note that if only a single channel has data to be transferred, the crossbar 517 allows that channel to monopolize the crossbar 517 until another channel has data to be transferred. The arbitration unit grants access to the output channels according to the arbitration policy utilized by the router, as discussed above.

It will be appreciated that other implementations of an arbitration unit may also be utilized within router 500. Any of a wide variety of arbitration policies and units may be employed by router 500 which allow an inbound link to obtain access to an outbound link, which allow the inbound link to maintain access to the outbound link until the transfer of the packet is completed, and which resolve conflicts between multiple input links for access to the same output link.

The appropriate output link for a flit can be determined in a wide variety of manners. In one embodiment, switching logic 530 within crossbar 517 monitors the flits as they are transferred through the crossbar 517. Each time the switching logic 530 monitors a flit which is a header block indicating the next portion of the path for this router, the crossbar 517 stores which output link all subsequent flits from that queue should be transferred to (until another appropriate header block is received). In an alternate embodiment, channel selecting logic 520 stores the appropriate output link for each packet. Alternatively, channel selecting logic 520 may assert a signal to crossbar 517 each time it receives a new header block. This signal indicates to crossbar 517 the appropriate output link 511–516 for all flits coming from the appropriate inbound queue until a new signal is asserted.

If a flit received by router 500 is the first flit in a new packet, then router 500 does not transfer the flit to the appropriate output link 511–516 until that appropriate output link is reserved (e.g., when no other packets are being transferred to the appropriate channel of the output link). It should be noted that, under certain circumstances, flits received via input link 501 may fill the inbound queue for channel A before the packet being received on input link 503 is completely transferred to channel A of output link 512. When this occurs, router 500 asserts a signal to the router it is receiving the packet from on input link 501 indicating to the prior router that the inbound queue is full and that transfer of flits to router 500 should be suspended until the signal is deasserted.

In the embodiment shown in FIG. 5, each output link 511–516 is associated with four outbound channels, each of which corresponds to an inbound channel of the input links 501–506. In one implementation of the present invention, crossbar 517 transfers one flit of data from an inbound channel to an outbound channel at a time. Each of the outbound channels comprises a 1-flit buffer which stores the flit until it is received by the next router. Alternatively, each of the outbound buffers may comprise a multiple-flit FIFO buffer (for example, the same size buffer as each of the inbound queues 518a–518d). Thus, even though only a single flit is transferred from an inbound channel to an outbound channel by crossbar 517, the flits may be stored temporarily in the outbound channel and transferred over the output link to the next router as a multiple-flit unit.

In one embodiment of the present invention, one of the output links 511–516 of router 500 is coupled directly to the computing node connected to router 500. These outbound channels are used and arbitrated for analogous to the outbound channels coupled to the other output links 511–516, except that the channels transfer data directly to the computing node rather than to another routing device.

In an alternate embodiment of the present invention, channel selecting logic 520 may be directly connected to the computing node. Thus, if the second flit is not a header block, then channel selecting logic 520 transfers the second and subsequent flits to the computing node connected to router 500. The channel selecting logic 520 continues to transfer the flits received from input link 501 to the computing node until the tail of the packet is received. Therefore, packets which are destined for the computing node coupled to router 500 are not transferred through crossbar 517 in this alternate embodiment.

In one embodiment of the present invention, each header flit includes an identifier of a direction and a number of jumps or hops to take in that direction. When the crossbar 517 receives a header flit, it checks the data within the header to determine which direction (e.g., positive x, negative x, positive y, negative y, positive z, or negative z) to transfer the packet. In one implementation, the crossbar 517 transfers the packet in the first direction in the order z/x/y/z which has a count greater than zero. The crossbar 517 then decrements the count in that direction by one, and proceeds to transfer the header flit and all subsequent flits for the packet in the indicated direction.

In one embodiment of the present invention, crossbar 517 also includes unusable router register 540, reroute direction register 542, and control logic 544. Unusable router register 540 maintains a record of which routing components within the system, if any, are unusable. Control logic 544 receives inputs from a central diagnostics unit (not shown) indicating which of the routing components in the system are unusable and updates unusable router register 540 accordingly. Control logic 544 also identifies a reroute direction for each of the unusable routing components and stores the direction(s) in reroute direction register 542. In one implementation of the present invention, control logic 544 also identifies which routing components are in an unusable component's "shadow", and updates unusable router register 540 to include these "shadow" routing components as unusable also. The shadow routing components and reroute directions are discussed in more detail below.

Figure 6:
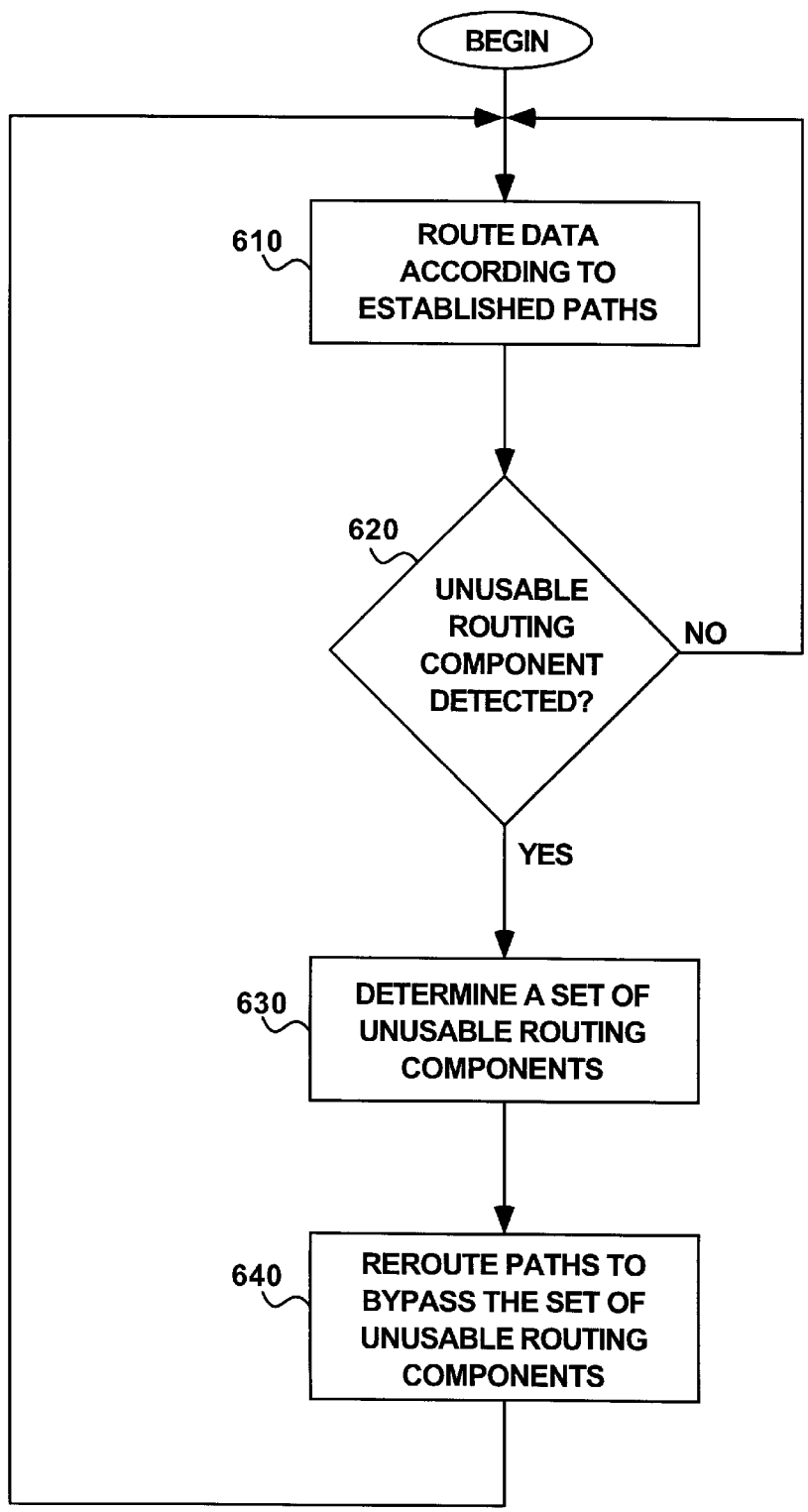
FIG. 6 is a flowchart showing the steps followed in determining paths for routing packets through a network according to one embodiment of the present invention.

FIG. 6 is a flowchart showing the steps followed in the present invention in determining paths for routing packets through a network. Initially, packets of data are routed between the source and destination nodes according to established paths, step 610. Each node within the network contains a list of paths which enables the node to transfer data to other nodes in the network.

The deadlock-free paths used in step 610 can be any of a wide variety of conventional routing schemes. One such routing scheme is the z/x/y/z dimension-order routing scheme discussed above. It is well understood by those skilled in the art that by adhering to one such deadlock-free routing scheme for all nodes for a specific virtual network, a set of paths can be generated between each node which are guaranteed to be deadlock-free, assuming no faulty components are in the network.

Each node within the network continually checks whether an unusable routing component in the system is detected, step 620. A component may become unusable due to any of a wide variety of circumstances. For example, a router may become faulty due to the control logic within the router malfunctioning and not performing its task(s) properly. Alternatively, other components which the router depends upon may become faulty, such as a power supply or one of he links between two routers. By way of another example, a router may be intentionally disabled by a system designer or user for testing or repair purposes. It should be noted that an unusable computing node is different from an unusable routing component. A computing node may become unusable, which means it is unavailable as a destination node. However, the routing component(s) which is directly connected to that node may still be fully functional. Thus, the routing component can still be used by the network even though the computing node cannot.

In one embodiment of the present invention, unusable routing components are detected by a central diagnostics unit. The central diagnostics unit is coupled to each router in the system and continuously monitors the behavior of the routing components within the system. When a faulty component is detected, the diagnostics unit broadcasts a signal, via a diagnostic network, to all nodes in the system indicating a faulty component has been detected. A faulty routing component can affect the transfer of data to a particular node by disabling one or all possible paths to that node.

In one implementation, the centralized diagnostics unit is coupled to each router in the system utilizing a serial bus which conforms to the IEEE Joint Test Action Group (JTAG) standard. Each router includes multiple error bits and an error pin coupled to the diagnostics unit. When a router discovers a possible error, the router sets the error bit(s) corresponding to the error discovered and asserts a signal via the error pin to the diagnostics unit. Which error bit(s) is set is dependent on the error discovered and may correspond to, for example, a parity error, low power, or an improper protocol (such as the first flit of a packet not being a header). Upon receipt of a signal from an error pin of a router, the diagnostics unit can access, via the serial bus, the error bits of the router to determine what error was detected. The diagnostics unit then determines whether the router is faulty. In one implementation, this determination is made based on the nature of the error (e.g., low power). Alternatively, the diagnostics unit may make this determination based on the frequency of error received (e.g., parity errors occurring too frequently). If the diagnostics unit determines the router is faulty, then the diagnostics unit broadcasts a signal to all nodes in the system indicating the identity of the failed router.

If no unusable routing components are detected in step 620, then each node in the network continues to use its current established paths to route data throughout the network, step 610. However, when an unusable component is detected, these established paths may be modified, depending on whether they attempt to use the unusable component.

Once an unusable component has been detected, the present invention determines a set of unusable routing components, step 630. This set of unusable routing components includes the unusable routing component detected in step 620. The set of unusable routing components may also include additional routing components, referred to as "shadow" routing components, as described in more detail below.

The present invention then reroutes paths to bypass the set of unusable routing components, step 640. The method used to bypass the unusable routing components is described in more detail below.

Upon the completion of the rerouting in step 640, the system returns to routing data according to the established paths. However, the established paths now include the rerouted paths from step 640.

In one embodiment of the present invention, the rerouting of paths is done at each router. Each router checks whether the next routing component in the path is one of the set of unusable routing components from step 630. If so, then the router reroutes around that unusable component. In an alternate embodiment, the rerouting of paths is done at the computing nodes. That is, when an unusable routing component is detected each computing node checks whether the paths it has stored to each possible destination computing node includes one of the set of unusable routing components from step 630. If so, then the computing node establishes a new path which routes around the unusable component.

Figure 7:
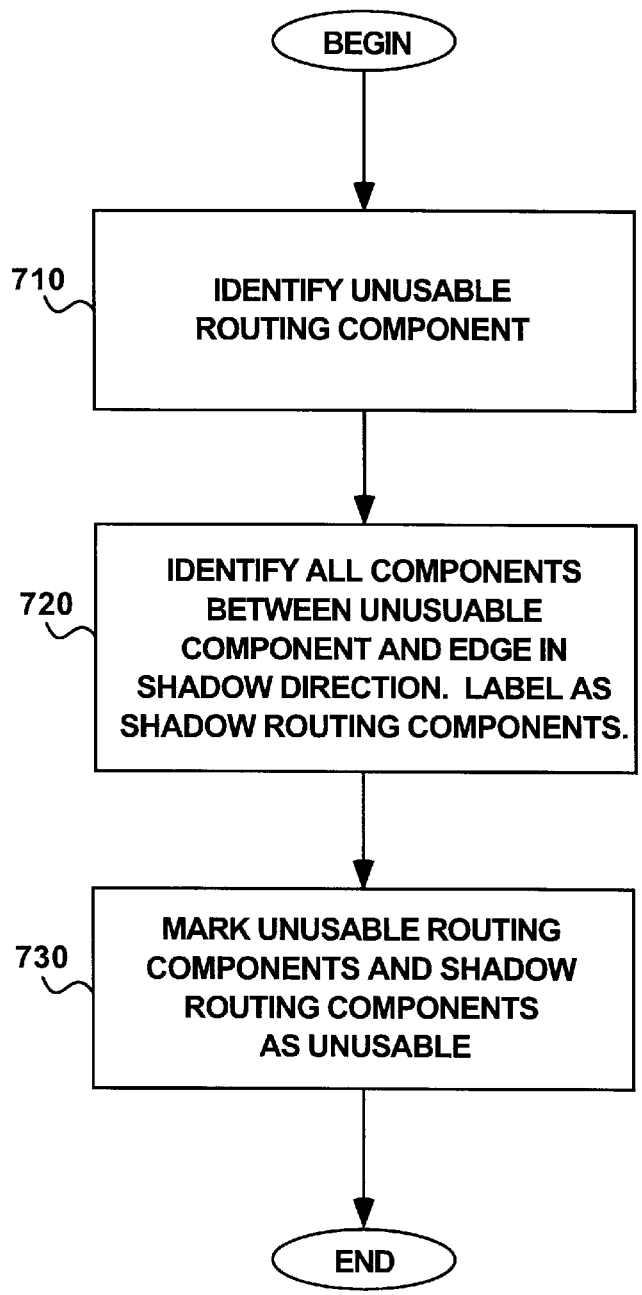
FIG. 7 is a flowchart showing the steps followed in determining a set of unusable routers according to one embodiment of the present invention.

FIG. 7 is a flowchart showing the steps followed in determining a set of unusable routers in more detail. In one implementation, the steps of FIG. 7 show step 630 of FIG. 6 in more detail.

The present invention first identifies the unusable routing component, step 710. In one embodiment an identification of the unusable routing component is provided by a central diagnostics unit, as discussed above.

All routers between the unusable routing component and an edge of the network in a shadow direction are then identified, step 720. The direction from the unusable routing component to the edge of the network is referred to as the shadow direction. Those components which are located between the unusable routing component and the edge of the network in the shadow dimension are referred to as "shadow" routing components. In one embodiment of the present invention, the edge of the network which is closest to the unusable routing component is used in step 720. For example, if router 110 of FIG. 1 were to become unusable, then the closest edge would be the edge at router 115. Thus, the shadow direction would be the negative x direction and router 115 would be a shadow router (in this example, router 115 is the only shadow router).

By way of another example, if router 210 of FIG. 2 were to become unusable, then the shadow direction would be the negative z direction and there would be no shadow routers. This is because router 210 is at the edge of the network (in the z dimension). By way of yet another example, if communication link 240 were to become unusable, then the shadow direction would be in the positive z direction and there would be no shadow routers.

The unusable routing component and all shadow routing components, if any, are then marked as unusable, step 730. In one embodiment, each of the routers maintains a record of the usable and unusable routing components in the system. Alternatively, each of the computing nodes may maintain a record of the usable and unusable nodes in the system. In one embodiment, step 730 is optional. In this embodiment, the shadow routing components are not completely unusable because paths are allowed to pass through (but not turn or end at) a shadow routing component, as discussed in more detail below.

In one embodiment of the present invention, a path is not permitted to turn or end at a shadow router or pass through an unusable router. A path is also not permitted to pass through an unusable communication link. However, a path is permitted to pass through a shadow router or a shadow communication link. A path is said to turn at a router if the path changes direction at the router. A path is said to end at a router if the destination node for the path is the node directly connected to the router. A path is said to pass through a router or communication link if the path traverses the router or link without turning or ending. For example, in FIG. 2, assume a path from node 230 (source) to node 205 (destination) includes pathway segments from router 231 to router 232 and from router 232 to router 202. The path in this example turns at router 232, ends at router 202, and passes through router 236 and communication link 203. Thus, in this embodiment of the present invention, use of the unusable router(s) is completely denied in the system and use of the shadow components is limited. The non-shadow routing components can be used to route packets through the network, and the shadow routing components can have packets pass through them, so long as the paths do not turn or end at a shadow router.

In one implementation, the determination of whether a path turns or ends at a shadow router is made by checking whether the other dimensions scheduled to be routed first have count values of zero. If the counts of the other dimensions scheduled to be routed first are zero, then the path would either turn or end at that shadow router.

It should be noted that there may be multiple edges which are all equally close to an unusable routing component with no other edges being closer to the unusable routing component. For example, router 212 of FIG. 2 has two edges that are equally close, one in the negative z direction and one in the negative y direction. The present invention may select any one of these multiple edges as the closest edge.

It should be noted that once the path of a packet has been rerouted such that the original path can proceed, then several options exist for completion of the path. In one embodiment of the present invention, the rerouted path between a source and destination node differs from the original path between the nodes in the rerouted path "horseshoeing" around the unusable routing component(s). For example, referring to FIG. 2, assume node 230 is the source node, node 205 is the destination node, and the original path travels from node 230 to router 231, router 231 to router 232, router 232 to router 202, and router 202 to node 205. Further assume that router 233 becomes faulty and that the shadow is chosen in the positive z direction. Then, following the "horseshoe" rerouting, the rerouted path travels from node 230 to router 231, router 231 to router 232, router 232 to router 234, router 234 to router 218, router 218 to router 236, router 236 to router 202, and router 202 to node 205. By way of another example, assume the same original path from node 230 (source) to node 205 (destination), and that communication link 241 becomes faulty and that the shadow is chosen in the positive z direction. Then, following the "horseshoe" rerouting, the rerouted path travels from node 230 to router 231, router 231 to router 232, router 232 to router 234, router 234 to router 216, router 216 to router 233, router 233 to router 202, and router 202 to node 205.

In an alternate embodiment of the present invention, the rerouted path attempts to continue on the course it was following in the original path prior to encountering the unusable routing component. Following the example above with the original path between node 230 and node 205, and router 233 becoming faulty, the rerouted path according to this alternate embodiment becomes node 230 to router 231, router 231 to router 232, router 232 to router 234, router 234 to router 235, router 235 to router 202, and router 202 to node 205.

It is to be appreciated that these paths are only examples of rerouted paths which could be generated by the present invention. It is to be appreciated that any of a wide variety of other deadlock free paths could be generated which bypass the unusable routing component based on the direction of the shadow.

Figure 8:
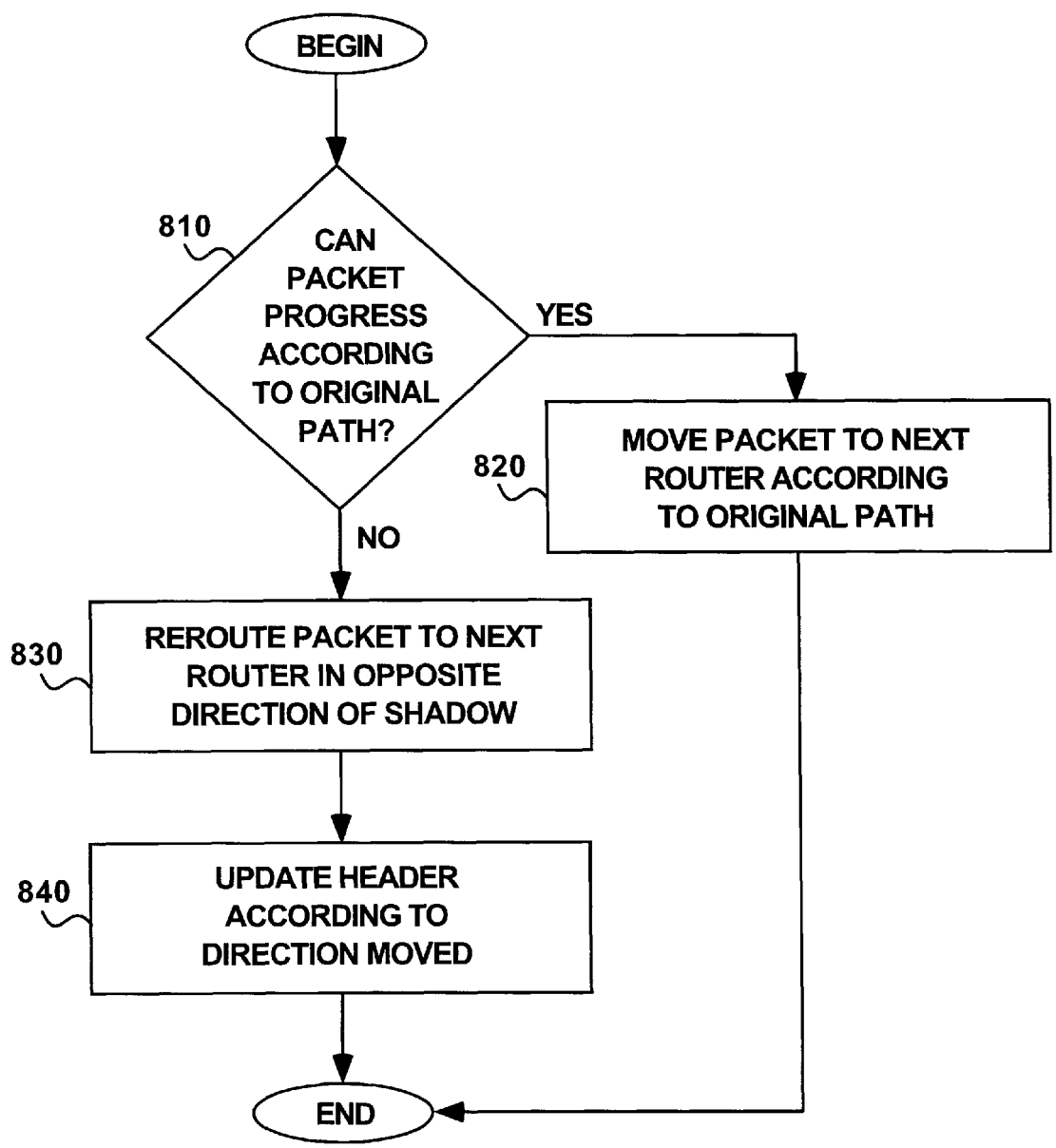
FIG. 8 is a flowchart showing the steps followed by each router in routing around a set of unusable routers according to one embodiment of the present invention.

FIG. 8 is a flowchart showing the steps followed by each router in routing around the set of unusable routing components in more detail according to one embodiment of the present invention. Upon receipt of a header block for a packet, the router checks whether the packet can progress according to the original path, step 810. In one implementation, this is done by checking whether the unusable router register within the router contains an identifier for the next routing component in the path or if the next route in the path uses a shadow router. If the next router is usable (e.g., the router or the communication link to the router is not identified in the unusable router register, and the router either is not a shadow router or is a shadow router and the path does not turn or end at the router), then the router forwards the packet to the next router according to the original path, step 820.

However, if the next router is not usable, then the computing node modifies the header block(s) to move the data in the opposite direction of the shadow, step 830. In one embodiment, the direction to reroute the packet is indicated by the reroute direction register within the router.

The header is then updated according to the rerouted direction, step 840. In one embodiment, this updating comprises decrementing the hop count field by one in the direction of movement. It is to be appreciated that this step may actually increment a hop count field by one in certain circumstances. For example, if the original path includes a hop count of two in the positive y direction, but the reroute direction is in the negative y direction, then rerouting in step 830 results in adding one to the hop count in the positive y direction (because decrementing by one in the negative y direction is equal to incrementing by one in the positive y direction).

In one embodiment of the present invention, rerouting of packets is done at the routers by updating the first header block received by the router. For example, if the reroute direction is in the negative z direction, then the router forwards the packet to the next router in the negative z direction and updates the first header block to indicate the path should move one hop in the positive z direction.

In an alternate embodiment of the present invention, an additional header block is inserted into the packet by the router. This additional header block indicates a hop of one in the direction which is opposite the reroute direction. In one implementation, the header block is added immediately following the current header block. For example, if the reroute direction is in the positive x direction, then the router forwards the packet to the next router in the positive x direction, and adds an additional header block to the packet to indicate the path should move one hop in the negative x direction.

Figure 9:
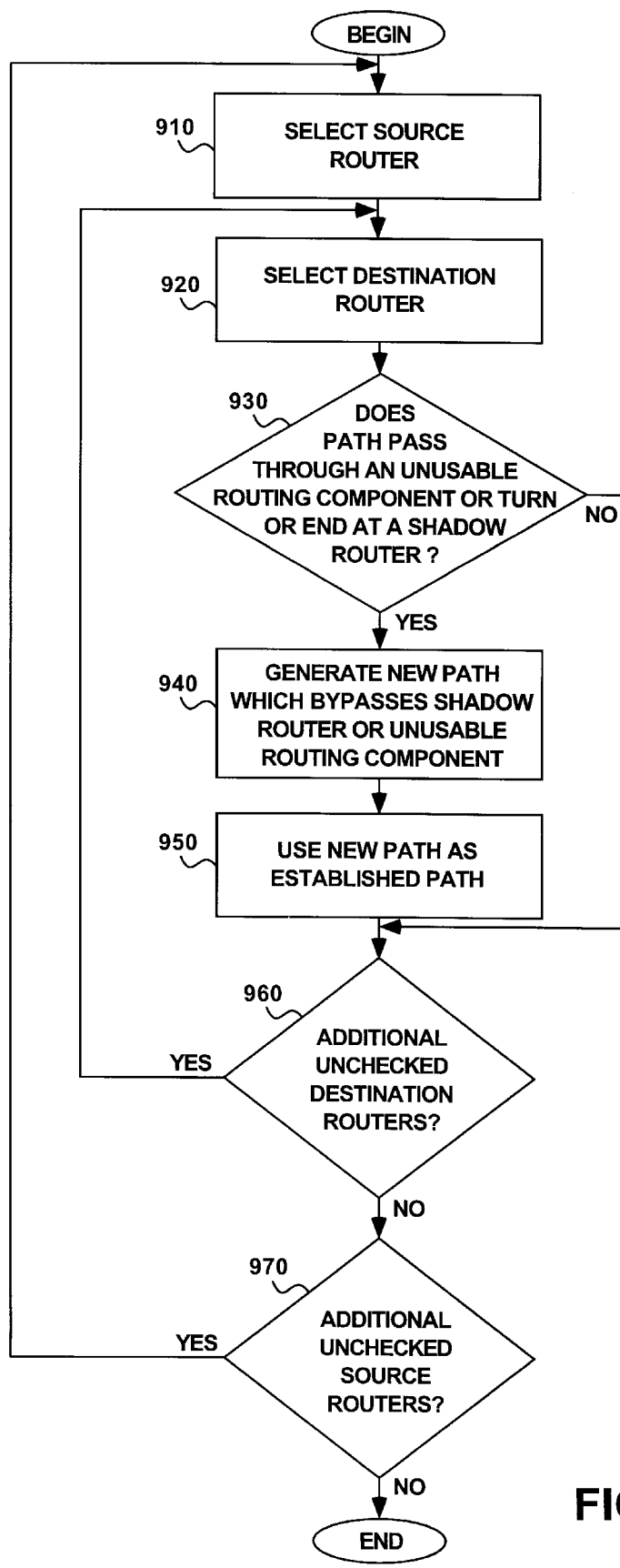
FIG. 9 is a flowchart showing the steps followed by a computing node in generating a path which routes around a set of unusable routers according to one embodiment of the present invention.

FIG. 9 is a flowchart showing the steps followed by a computing node in generating a path which routes around the set of unusable routing components in more detail according to one embodiment of the present invention. In one implementation, the steps of FIG. 9 show step 640 of FIG. 6 in more detail.

The computing node first selects a source router, step 910. A destination router is then selected, step 920. The computing node then checks whether the established path between the source router and the destination router passes through an unusable routing component or turns or ends at a shadow router, step 930. In one implementation, this check is done for each possible path between all usable routers in the network.

In one embodiment of the present invention, each node in the network knows the topology of the network. That is, each node contains information indicating which nodes are connected to which other nodes in the network and via which links and additional routers (if any) the nodes are connected.

If the path between the source and destination routers does not pass through an unusable routing component or turn or end at a shadow router, then the computing node checks whether another unchecked destination node exists, step 960. If so, then another destination node is selected, step 920. If no unchecked destination routers exist, then the computing node checks whether any additional unchecked source routers exist, step 970. If so, then another source router is selected, step 910. If no unchecked source routers remain, then the rerouting is completed.

Returning to step 930, if the path does pass through an unusable routing component or turn or end at a shadow router, then the computing node generates a new path which bypasses the shadow router or unusable routing component, step 940. The computing node then proceeds to use the new path as the established path, step 950. The computing node then proceeds to determine whether any unchecked destination or source nodes remain, steps 960 and 970.

Figure 10:
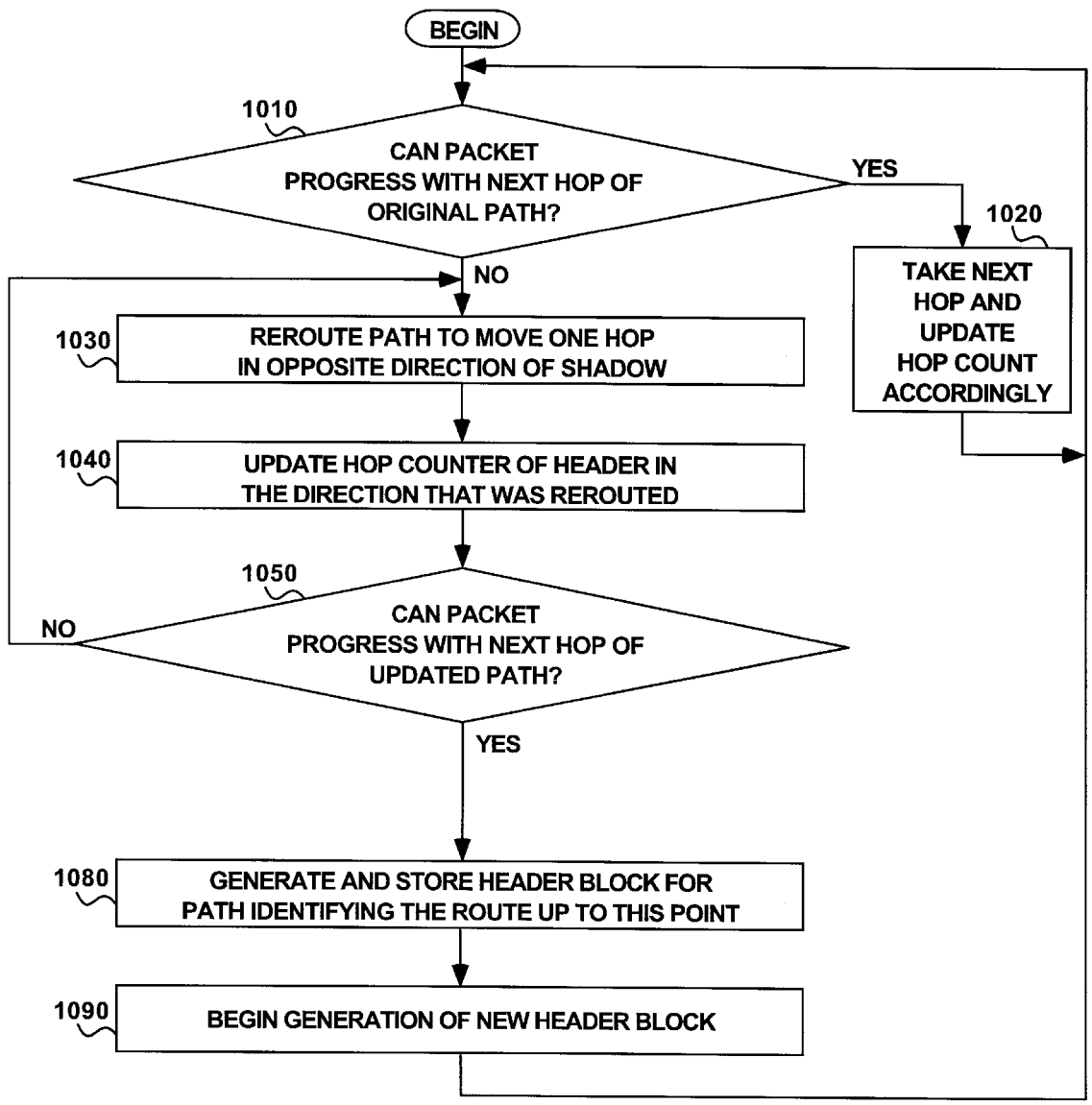
FIG. 10 is a flowchart showing the steps followed in generating a new path between two routers according to one embodiment of the present invention.

FIG. 10 is a flowchart showing the steps followed in generating a new path between two routers in more detail according to one embodiment of the present invention. In one implementation, the steps of FIG. 10 show step 940 of FIG. 9 in more detail.

The computing node checks the path router by router through the network. The computing node checks, for each hop or transition between two routers, whether data can progress according to the original path, step 1010. In one implementation, this is done by checking whether the next hop would result in passing through an unusable routing component or result in a turn or ending at a shadow router. If the next hop can be taken, then that hop is taken and the header is updated accordingly, step 1020. The computing node then proceeds to check whether the next hop can be taken, step 1010.

However, if the next hop cannot be taken, then the computing node reroutes the data in the direction opposite the shadow, step 1030. The header is then updated according to the rerouted direction, step 1040. In one embodiment, this updating comprises decrementing the hop count field by one in the direction of movement.

The computing node then checks whether the packet can progress with the next hop of the updated path, step 1050. In one implementation, this checking is done by determining whether the next hop in the updated path would result in passing through an unusable routing component or result in a turn or ending at a shadow router. If the packet cannot progress with the next hop of the updated path, then the computing node returns to step 1030 to reroute the packet another hop. However, if the packet can progress with the next hop of the updated path, then a header which identifies the path taken up to this point is generated and stored, step 1080.

Generation of a new header block then begins, step 1090. This new header attempts to continue with the updated path, as modified up through step 1080. This modification includes hops which were in furtherance of the updated path, as well as hops taken in rerouting the path.

It is to be appreciated that the steps shown in FIG. 10 are an example of rerouting paths by the computing nodes according to one embodiment of the present invention. Additional methods may also be implemented which are within the spirit and scope of the present invention. For example, a new header could be generated at step 1040 as soon as an unusable router is encountered, rather than waiting for movement in the rerouted direction.

In one embodiment of the present invention, each computing node generates a rerouted path which bypasses the unusable router(s) in a horseshoe manner. In this embodiment, the computing node maintains a record of the number of hops the path has taken in the reroute direction. The computing node then moves the path two hops according to the original path once the unusable routing component has been passed. The computing node then moves the path the number of hops taken in rerouting the packet, except it moves the path in the shadow direction rather than the reroute direction. Thus, in this embodiment, the computing node generates a rerouted path which horseshoes around the unusable router(s).

It is to be appreciated that although the present invention is described as identifying the edge of the network closest to the unusable router, any of the edges can be selected.

In one embodiment of the present invention, the method of the present invention is implemented as a series of software routines that are run by one or more processors of the computing nodes. In one implementation, the method is implemented in the C programming language.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

Thus, a method and apparatus for deadlock-free routing around an unusable routing component in an n-dimensional network has been described.

What is claimed is:

1. A method for deadlock-free routing around an unusable routing component, wherein the method routes data from a source router to a destination router of a network, the method comprising the steps of:

determining a first direction from the unusable routing component to an edge of the network; and routing a path for the data from the source router to the destination router which bypasses the unusable routing component and limits use of an immediately adjacent routing component in the network between the unusable routing component and the edge in the first direction.

2. The method of claim 1, wherein the unusable routing component is a routing device.

3. The method of claim 1, wherein the unusable routing component is a communication link.

4. The method of claim 1, wherein the step of routing comprises the step of routing the path for the data from the source router to the destination router which bypasses the unusable routing component and limits use of each routing component in the network between the unusable routing component and the edge in the first direction.

5. The method of claim 1, wherein the step of determining comprises the steps of:

determining an edge of the network which is closest to the unusable routing component; and identifying the first direction as being a direction from the unusable routing component to the edge of the network which is closest to the unusable routing component.

6. A method for deadlock-free routing around an unusable routing component, wherein the method routes data from a source router to a destination router of a network, the method comprising the steps of:

identifying the unusable routing component;

determining a first direction from the unusable routing component to an edge of the network;

identifying a plurality of shadow routing components; and routing a path for the data from the source router to the destination router which bypasses the unusable routing component and limits use of any routing components in the network between the unusable routing component and the edge in the first direction.

7. The method of claim 6, wherein the plurality of shadow routing components are located within the network between the unusable routing component and the edge of the network in the first direction.

8. The method of claim 6, wherein the step of determining comprises the steps of:

determining an edge of the network which is closest to the unusable routing component; and identifying the first direction as being a direction from the unusable routing component to the edge of the network which is closest to the unusable routing component.

9. A method for deadlock-free routing around an unusable routing component, wherein the method routes data from a source router to a destination router of a network, the method comprising the steps of:

identifying the unusable routing component;

determining a first direction from the unusable routing component to an edge of the network; and routing a path for the data from the source router to the destination router in a second direction away from the edge which bypasses the unusable routing component and limits use of any routing components in the network between the unusable routing component and the edge in the first direction.

10. A method for deadlock-free routing around an unusable routing component, wherein the method routes data from a source router to a destination router of a network, the method comprising the steps of:

identifying the unusable routing component;

determining a first direction from the unusable routing component to an edge of the network; and routing a path for the data from the source router to the destination router which bypasses the unusable routing component and limits use of any routing components in the network between the unusable routing component and the edge in the first direction, wherein the routing includes routing the data through a first router, wherein the first router is located in the network between the unusable routing component and the edge in the first direction, provided the first router is not the destination router, and provided the path does not turn at the first router.

11. A method for deadlock-free routing of data around an unusable routing component in a network, the method comprising the steps of:

(a) determining a shadow direction from the unusable routing component to an edge of the network;

(b) determining whether the data can progress according to an original path;

(c) routing the data along the original path, provided the data can progress according to the original path; and (d) moving the data in a first direction, provided the data cannot progress according to the original path, wherein the first direction is opposite the shadow direction.

12. The method of claim 11, further comprising the step of:

(e) decrementing a counter associated with the data to indicate that the data has moved in the first direction.

13. The method of claim 11, wherein the step of determining a shadow direction comprises the steps of:

determining an edge of the network which is closest to the unusable routing component; and identifying the shadow direction as being a direction from the unusable routing component to the edge of the network which is closest to the unusable routing component.

14. An apparatus for deadlock-free routing of data around an unusable routing component in a network, wherein the data is originally routed from a source router to a destination router, wherein the apparatus comprises:

an unusable router register which stores an identifier of the unusable routing component; and control logic, communicatively coupled with the unusable router register, to determine a first direction from the unusable routing component to an edge of the network and to route the data to the destination router via a path which bypasses the unusable routing component and limits use of an immediately adjacent routing component in the network between the unusable routing component and the edge in the first direction.

15. The apparatus of claim 14, wherein the control logic is further operative to update the unusable router register responsive to a routing component in the network becoming faulty.

16. The apparatus of claim 14, wherein the unusable routing component is a router.

17. The apparatus of claim 14, wherein the unusable routing component is a communication link.

18. The apparatus of claim 14, wherein the control logic is operative to route the data from the source router to the destination router via a path which bypasses the unusable routing component and limits use of each routing component in the network between the unusable routing component and the edge in the first direction.

19. The apparatus of claim 14, wherein the control logic is further operative to determine the first direction by determining an edge of the network which is closest to the unusable routing component and identifying the first direction as being a direction from the unusable routing component to the edge of the network which is closest to the unusable routing component.

20. A system comprising:

a plurality of processing nodes, wherein each of the plurality of processing nodes includes a processor and a memory device; and a plurality of routing devices coupled to the plurality of processing nodes, wherein each of the plurality of routing devices transfers data to other routing devices, and wherein each of the plurality of routing devices includes, an unusable router register which contains an identifier of an unusable routing component, and control logic, communicatively coupled with the unusable router register, to determine a first direction from the unusable routing component to an edge of the system and to route the data via a path which bypasses the unusable routing component and limits use of an immediately adjacent routing component in the system between the unusable routing component and the edge in the first direction.

21. The system of claim 20, wherein the control logic is further operative to update the unusable router register responsive to a routing component in the system becoming faulty.

22. The system of claim 20, wherein the unusable routing component is one of the plurality of routing devices.

23. The system of claim 20, wherein the control logic is operative to route the data via a path which bypasses the unusable routing component and limits use of each routing component in the system between the unusable routing component and the edge in the first direction.

24. The system of claim 20, wherein the control logic is further operative to determine the first direction by determining an edge of the system which is closest to the unusable routing component and identifying the first direction as being a direction from the unusable routing component to the edge of the system which is closest to the unusable routing component.

25. An apparatus for deadlock-free routing of data around an unusable routing component, wherein the data is routed from a source router to a destination router in a network, the apparatus comprising:

an unusable router register to store an identifier of the unusable routing component; and control logic, communicatively coupled to the unusable router register, to determine a first direction from the unusable routing component to an edge of the network, to identify a plurality of shadow routing components, and to route the data from the source router to the destination router bypassing the unusable routing component and limiting use of any routing components between the unusable routing component and the edge in the first direction.

26. An apparatus for deadlock-free routing around an unusable routing component, wherein the data is routed from a source router to a destination router in a network, the apparatus comprising:

an unusable router register to store an identifier of the unusable routing component; and control logic, communicatively coupled to the unusable router register, to determine a first direction from the unusable routing component to an edge of the network, and to route the data from the source router to the destination router bypassing the unusable routing component and limiting use of any routing components in the network between the unusable routing component and the edge in the first direction, wherein the routing includes routing the data through a first router located between the unusable routing component and the edge in the first direction, provided the first router is not the destination router, and provided the routing does not turn at the first router.

27. A system comprising:

a plurality of processing nodes, wherein each of the plurality of processing nodes includes a processor and a memory device; and a plurality of routing devices coupled to the plurality of processing nodes, wherein each of the plurality of routing devices transfers data to other routing devices, and wherein each of the plurality of routing devices includes, an unusable router register to store identifiers of one or more unusable routing components; and control logic, communicatively coupled to the unusable router register, to determine a first direction from one of the one or more unusable routing component to an edge of the system, to identify a plurality of shadow routing components, and to route the data from a first routing device of the plurality of routing devices to a second routing device of the plurality of routing devices bypassing the one of the one or more unusable routing components and limiting use of any routing components in the system between the one of the one or more unusable routing components and the edge in the first direction.

28. A system comprising:

a plurality of processing nodes, wherein each of the plurality of processing nodes includes a processor and a memory device; and a plurality of routing devices coupled to the plurality of processing nodes including a first routing device, a second routing device, and a third routing device, wherein each of the plurality of routing devices transfers data to other routing devices, and wherein each of the plurality of routing devices includes, an unusable router register to store identifiers of one or more unusable routing components; and control logic, communicatively coupled to the unusable router register, to determine a first direction from a first unusable routing component of the one or more unusable routing components to an edge of the system, and to route the data from the first routing device to the second routing device bypassing the first unusable routing component, limiting use of any routing components in the system between the first unusable routing component and the edge in the first direction, and routing the data through the third routing device located between the first unusable routing component and the edge in the first direction, provided the second routing device and the third routing device are different routing devices, and provided the routing does not turn at the third routing device.

29. A machine-readable storage medium having stored therein a plurality of programming instructions for use by a processor, wherein the plurality of programming instructions implements the method steps of:

determining a first direction from an unusable routing component to an edge of a network; and routing a path for the data from the source router to the destination router which bypasses the unusable routing component and limits use of an immediately adjacent routing component in the network between the unusable routing component and the edge in the first direction.

30. The machine-readable storage medium of claim 29, wherein the step of routing comprises the step of routing the path for the data from the source router to the destination router which bypasses the unusable routing component and limits use of each routing component in the network between the unusable routing component and the edge in the first direction.

31. A machine-readable storage medium having stored therein a plurality of programming instructions for use by a processor, wherein the plurality of programming instructions implements the method steps of:

determining a first direction from an unusable routing component to an edge of a network;

identifying a plurality of shadow routing components; and routing a path for the data from the source router to the destination router which bypasses the unusable routing component and limits use of any routing components in the network between the unusable routing component and the edge in the first direction.

32. A machine-readable storage medium having stored therein a plurality of programming instructions for use by a processor, wherein the plurality of programming instructions implements the method steps of:

determining a first direction from an unusable routing component to an edge of the network; and routing a path for the data from the source router to the destination router which bypasses the unusable routing component and limits use of any routing components in the network between the unusable routing component and the edge in the first direction, wherein the routing includes routing the data through a first router, wherein the first router is located in the network between the unusable routing component and the edge in the first direction, provided the first router is not the destination router, and provided the path does not turn at the first router.

* * * * *

UNITED STATES PATENT AND TRADEMARK OFFICE
CERTIFICATE OF CORRECTION

PATENT NO. : 5,898,826
DATED : April 27, 1999
INVENTOR(S) : Pierce et al.

It is certified that error appears in the above-identified patent and that said Letters Patent is hereby corrected as shown below:

Column 7,
Line 36, insert -- of --.

Column 11,
Line 48, delete "buffers" and insert -- channels --.

Signed and Sealed this

Twenty-fifth Day of November, 2003

JAMES E. ROGAN
*Director of the United States Patent and Trademark Office*